Sept. 1, 1931. O. U. ZERK 1,821,197
LUBRICATING GUN
Filed Oct. 21, 1929
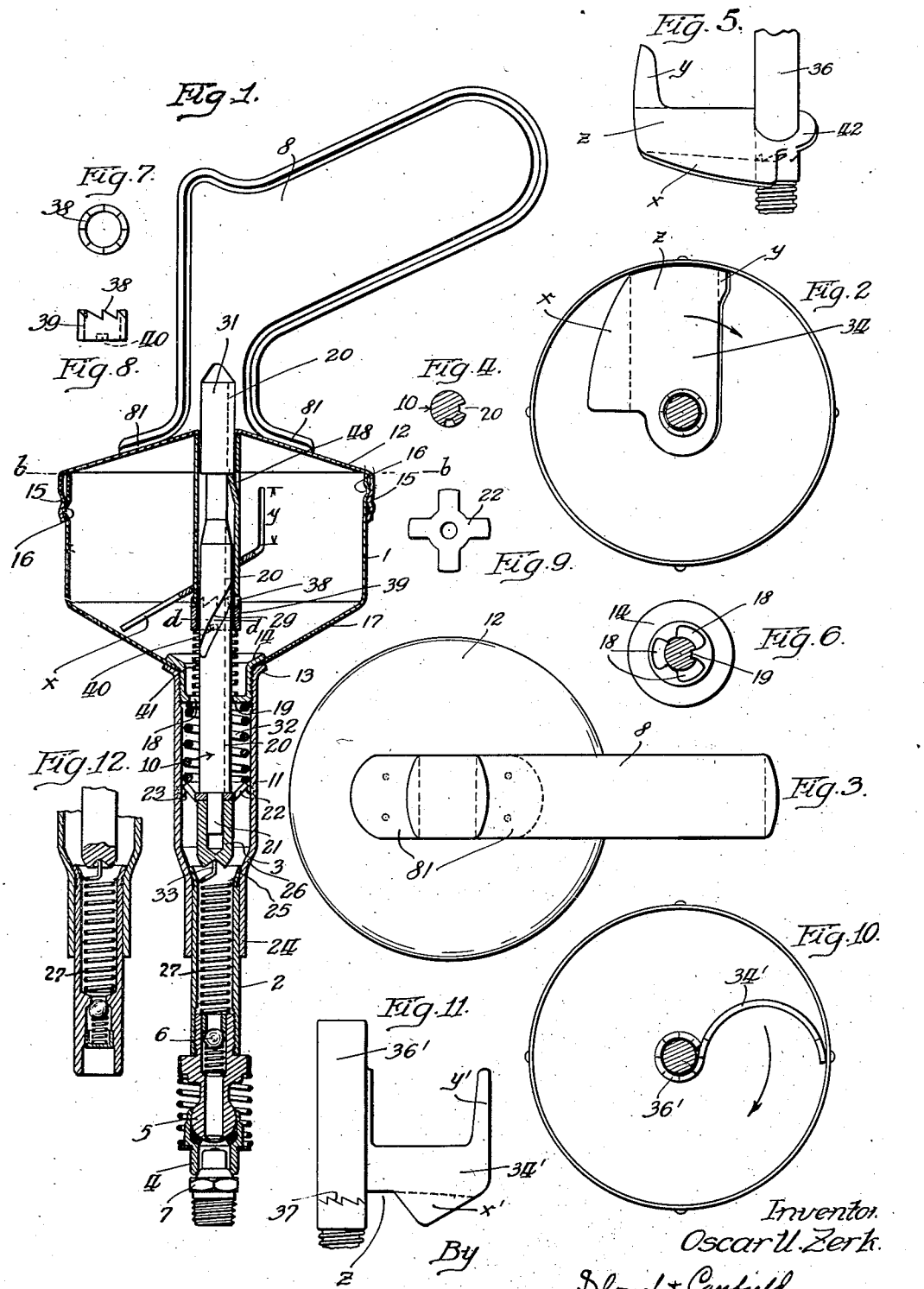
Inventor.
Oscar U. Zerk.
By Slough + Canfield Attys Patented Sept. 1, 1931

1,821,197

UNITED STATES PATENT OFFICE

OSCAR U. ZERK, OF CHICAGO, ILLINOIS, ASSIGNOR TO ALEMITE CORPORATION, OF CHICAGO, ILLINOIS, A CORPORATION OF DELAWARE

LUBRICATING GUN

Application filed October 21, 1929. Serial No. 401,281.

My present invention relates to lubricating guns and more particularly to that class of lubricating guns commonly known in the trade as grease guns, which are employed for the purpose of quickly and easily supplying a quantity of grease to bearing nipples of an automobile chassis or other mechanism requiring periodic lubrication.

The apparatus of my present invention is equally well adapted for use in connection with the lubrication of vehicles, such as the chassis bearings of automobiles, tractors, gun carriages, war tanks, locomotives, airplanes, airships, sea vessels, etc., or in connection with industrial lubrication, which includes the lubrication of stationary machines, such as stamping presses, printing presses, engines, textile machinery, shafting, and all the other numerous types of machines and machine tools of modern industry.

In grease gun lubrication, the two types of apparatus are commonly used; first, the interlocking type employing a coupling for temporarily rigidly interlocking the lubricating gun nozzle and the lubricant receiving nipple, and second, the contact type where the lubricating gun nozzle and nipple are not temporarily rigidly interlocked, but simply pressed against each other and held in lubricant communicating contact by manual pressure during the lubricating period.

My present invention applies to both the interlocking and contact type of guns, although it is believed to have a more particular application to guns of the contact type. The dimension of the lubricant containing reservoir, or barrel, not only depends upon the quantity of lubricant which the barrel is required to hold, but also upon such other considerations as the necessity of operating the gun in connection with lubricant receiving nipples which are often located in position difficult of access, considerations involved in the guns, and in the packaging and sale of the same.

I also preferably provide the gun with a nipple engaging nozzle of such form that the lubricant barrel can be oscillated from alignment with the axis of the nipple to place it in such a position where it will not interfere with any adjacent part of the mechanism carrying the nipple; I, therefore, contemplate the use of the gun of my present invention in connection with a nozzle and nipple construction as is more particularly disclosed and claimed in my copending companion application for United States Letters Patent, Serial No. 396,352, filed September 30, 1929.

However, particularly in its broader aspects, my gun may be employed with other nozzle and nipple constructions, as will be apparent to those skilled in this art to which my invention appertains.

The lubricant containing barrel is made of large diameter relative to its length, being preferably of a diameter twice its length, thereby achieving important advantages. Such a barrel being relatively short and shallow, is capable of being easily filled with grease with little entrapment of air bubbles, and has the additional advantage of being relatively inexpensive to manufacture, since a barrel of the shallow type shown, can be made in one drawing operation without annealing, while a deep elongated tubular barrel of the relatively small diameter employed in the older type of guns, requires six to ten drawing operations, with one to three interposed annealing operations.

The use of a shallow barrel is advantageous in combination with my new type of grease impeller, as fully explained herein.

When guns having contact nozzles, making pressure engagement with nipples of the contact type, have been used to dispense grease at high pressure, piston followers have commonly been employed in contact with the rear surface of the body of grease in the gun barrel to prevent air being drawn through the body of grease responsive to lubricant being forced from the forward end of the barrel by the action of a high pressure piston telescoping in a cylinder to supply lubricant to the engaged nipple.

Such piston followers have been commonly guided either by the lateral walls of the lubricant containing barrel, or by the piston rod extending reciprocably axially of the barrel, or by both, and are required to be removed when the barrel is recharged with lubricant, such removal being sometimes attended with difficulty due to the partial vacuum commonly created by the rearward movement of such followers.

Such followers are, moreover, objectionable since they can only exercise their intended function for such portion of the entire body of grease as may be contained in the portion of the cylinder comprising the barrel which is of uniform cross-sectional area; for instance, where conical ends are provided for the barrel a follower which fits the lateral walls of other portions thereof will not be able to fit into such conical end portions and, in such a case, often retards flow of grease therefrom rather than assisting in expressing such grease; grease will, therefore, be retained which cannot be expelled prior to refilling of the barrel.

An object of my invention, therefore, is to provide a lubricant gun with a barrel for supplying grease to the higher pressure cylinder of the gun wherein lubricant will be continuously supplied to the high pressure cylinder until practically all of the grease is dispensed therefrom.

Another object of my invention is to provide a positive impeller mechanism for grease in the barrel to positively move it toward the high pressure cylinder of the gun.

Another object of my invention is to remove the adhesive contact between lateral portions of the grease in the barrel forming a lubricant reservoir, deflecting the lubricant towards the center of said barrel from whence it is fed into the high pressure cylinder of the gun.

Another object of my invention is to accomplish the aforesaid objects by providing a rotatable impeller which is so formed that while it efficiently performs its intended functions without disturbing the body of grease immediately adjacent to the mouth of the passage leading to the pressure chamber of the gun.

Another object of my invention is to provide improved impeller means for grease adapted to effect a constantly operative impelling effort to move the grease toward a dispensing mechanism.

Another object of my invention is to provide an improved lubricant gun adapted to efficiently supply lubricant to nipples adapted for temporary engagement by a nozzle of the gun, at high pressure, and which provides for substantially continuous forward movement of the lubricant in a reservoir barrel of the gun to the high pressure lubricant compressing and dispensing cylinder thereof.

Another object of my invention is to provide an improved grease gun with improved means to prevent air being drawn through the body of grease to the lubricant dispensing high pressure chamber of the gun.

Another object of my invention is to provide an improved grease gun with improved means to prevent air being drawn through the body of grease to the lubricant dispensing high pressure chamber of the gun.

Other objects of my invention and invention itself will be apparent to those skilled in the art to which my invention appertains from the following description of certain embodiments of my invention, and in which reference is had to the accompanying drawings illustrating the said embodiments.

In the drawings:

Fig. 1 is a longitudinal medial sectional view of a grease gun embodying my invention, applied to a lubricant receiving nipple;

Fig. 2 is a section taken on the line $b-b$ of Fig. 1;

Fig. 3 is a plan view of the posterior end of the gun of Fig. 1;

Fig. 4 is a transverse section of certain elements of the grease gun of the said embodiment, taken on the line $d-d$ of Fig. 1;

Fig. 5 is a side elevational view of certain parts of the impeller mechanism for the grease gun of Fig. 1;

Fig. 6 is a transverse sectional view taken on the line $a-a$ of Fig. 1;

Fig. 7 is an end plan view of a ratchet annulus;

Fig. 8 is a side elevational view of the annulus of Fig. 7;

Fig. 9 is a plan view of a stop for a piston rod of the said embodiment;

Fig. 10 is a view, otherwise similar to that of Fig. 2, but illustrating another embodiment of my invention;

Fig. 11 is a side elevational view of parts shown in Fig. 10;

Fig. 12 is a longitudinal medial sectional view of an alternative construction for the dispensing elements of such a grease gun as illustrated in Fig. 1.

Referring now, first, to the embodiment of my invention illustrated in Figs. 1 to 9, inclusive, in all of which like parts are designated by like reference characters, the gun is provided with a relatively short tubular container 1 forming a lubricant reservoir, said container being herein sometimes referred to as the barrel of the gun and adapted to supply lubricant to a pressure cylinder 2 which is adapted to be telescoped over a piston 3, which is of small diameter relative to the barrel 1, to eject lubricant through a terminal nozzle 4, which is joined to the gun by a lubricant conducting universal joint mechanism 5 and through a check valve 6.

A nipple 7 is engaged by the nozzle 4 pressed against it by a longitudinal directed manually effected and maintained pressure applied to the pistol grip element 8 which is affixed by welding its flange 8' to the posterior end wall of the reservoir cap 12. The cap 12 is adapted to fit onto the open end of the reservoir 1, being secured thereto by a tubular flange 15 of the cap having screw threads formed thereon, said threads engaging with lateral projections 16 of the tubular container 1.

The piston 3 is supported on the end of a piston rod 10, which extends axially through the reservoir and into the enlarged approach conduit 11 provided for conducting lubricant from the reservoir 1 to the high pressure cylinder 2.

The tubular conduit 11 is provided with an outwardly flaring end 13 which together with the apertured cup-shaped element 14, screw threaded into the tube 11 clamps portions of the end wall 17 bordering its central aperture, between the flaring end 13 of the conduit and a correspondingly flaring rim portion of the said apertured element 14.

The element 14 is provided with openings 18 through its end wall for the passage of grease from the reservoir 1 to the interior of the conduit 11. The remaining annular portion of the said end wall comprises a projection 19 extending inwardly, to fit within the longitudinal groove 20 of the piston rod 10. The groove 20 preferably extends from end to end of the rod 10 exclusive of its reduced tip 21 onto which the piston 3 is tightly fitted, either by screw threading the tip 21 into a recess of the piston or by making a tight drive fit of the tip into such recess.

A cruciform stop element 22 is securely clamped between the piston 3 and the enlarged portion of the rod 10 and engages with a shoulder formed on the inner surface of the conduit 11, in any suitable manner such as by crimping the tubular walls of the container inwardly, as shown at 23. The high pressure cylinder 2 makes a sliding fit at 24 with the interior walls of the end portion of the conduit 11 and is outwardly flared at its inner end 25 to form a stop element engageable with the inclined walls 26 of the conduit to prevent removal of the cylinder element from the conduit.

Also, the inner surfaces of the flared end portion 25 of the cylinder form a guiding mouth to direct the relatively telescoping movement of the piston 3 and cylinder 2, upon a telescoping movement of the cylinder 2 within the conduit 11 and over the piston 3.

Besides the longitudinal groove 20 of the piston rod 10, another groove 29 is provided on the outer surface of the rod 10, communicating at its upper end with the groove 20 and extending in a preferably spiral direction therefrom.

The piston rod is maintained in alignment by surfaces of the conduit 11 engaging with the edges of the arms of the element 22, by the engaging portion of the element 14 and by the knob 31 at the end of the rod, which engages the edges of the central aperture for the reservoir cap 12, and is spring pressed by the spring 32 to its position as shown wherein engagement is had between the element 22 and the shoulder 23 of the supply conduit.

The knob portion 31 of the rod 10 is likewise provided with a continuation of the longitudinal groove 20 and the rod is reduced intermediate its spirally grooved portion and the knob 31. The tubular impeller shaft 36, later more fully described, telescoped over the rod 10 is provided with an inward projection 48 of greater width than the width of the groove 20 so that it cannot enter the groove, and is engageable with the shoulder provided by the knob 31 and the enlarged spirally grooved portion of the rod 10 so that when the cap 12 is removed from the barrel 1 the impeller 34, supported on the shaft 36 together with said shaft, will be removable with said cap, the rod 10 and the hand grip 8 rigidly affixed to the cap.

When the gun is operated by pressure exerted upon the handle 8 toward the nipple 7, the nozzle 4 engages with the nipple and the tubular conduit 11 is telescoped over the outer walls of the cylinder 2, and at the same time the piston 3 is telescoped within the walls of the cylinder 2. Lubricant is, therefore, compressed between the end of the piston 3 and the walls of the cylinder and expressed therefrom past the ball valve 6 and through the interconnecting conduit passages of the gun nozzle and nipple to the bearing to be lubricated.

Upon engagement of the element 22 by the end 25 of the cylinder element 2, during the lubricating operation just described, the piston rod 10 will be telescoped further toward the handle 8 than shown and will have its knob 31 projected into the interior of said handle.

Upon relief of the manual effort, the parts will be restored to their positions shown. A helical spring 27 interposed between an end of a dispensing nose 26 of the gun and a concave surface on the end of the piston 3 effects retraction of the cylinder element 2, with said nose and nozzle supported thereon to their relatively extended positions shown.

By spacing the end convolution 28 of the spring 27 from the end of the piston 3, as by providing the longitudinally extending portion 33 for said spring making contact with the piston, free and ready access of lubricant to the interior of the high pressure cylinder 2 is permitted.

The construction of the dispensing end of the gun represented in Fig. 12 is like that described for the embodiment of Fig. 1, except that the universal joint interconnecting the nozzle and the pressure cylinder is omitted and the nozzle 4' is integrally joined to the pressure cylinder 2.

In order to effect compacting of the grease contained in the reservoir 1, to scrape the grease from the lateral walls of the reservoir, and to place it in most efficient position for communication to the intercommunicating conduit 11 leading to the high pressure cylinder certain instrumentalities shown within the reservoir in Fig. 1, and more specifically in Figs. 2 and 4 to 8, inclusive, exclusive of Fig. 5, are employed.

The means provided for this purpose comprise an impeller blade shown generally at 34, portions of which are preferably inclined to any plane parallel to and passing through the axis of the tubular reservoir 1. A tubular impeller shaft 36 is passed through an elongated aperture of the impeller and supported by the impeller. The tubular shaft 36 is journaled loosely on the piston rod 10 and is provided at its end 37 with ratchet teeth engaging with cooperatively formed ratchet teeth 38 provided on an engaged end edge portion of a tubular ratchet element 39.

The ratchet element 39 is best shown in Figs. 8 and 7 wherein the ratchet teeth 38 are shown as extending from an end edge portion of the annulus and a key projection 40 extends inwardly from the annulus at its other end. The spiral groove 29 receives the projection 40 of the annulus 39.

The annulus 39 is spring pressed by a spring 41 interposed between the annulus and the end wall for the cup-shaped element 14 to maintain ratcheting engagement between the ratchet teeth of the annulus and the impeller shaft. This arrangement provides for rotary movement of the propeller shaft on the piston rod to a degree dependent upon the pitch of the spiral groove 29 and its length, whenever the piston rod is reciprocated toward the handle 8 during the operation of the gun, as previously described, since the lateral walls of the groove 29 engage the key projection 40 to rotate the annulus which is turned by the ratcheting engagement with the tubular impeller shaft, moves the impeller circuitously around the piston rod.

The impeller comprises a forwardly disposed tip Y, an intermediate portion Z, which contains the apertured projection 42, by which the impeller is supported on its tubular shaft 36, and a trailing vane portion X.

The forwardly disposed tip Y extends generally in a plane approximately parallel to a plane passing through the axis of the impeller shaft, and the trailing vane portion of the impeller is projected substantially in alignment with the intermediate portion Z, generally obliquely to the axis of the shaft 36.

The arrows in Fig. 2 indicate the direction of rotation of the impeller 34. The tip Y is relatively narrow and extends longitudinally along the cylindrical side walls of the reservoir 1 to sweep lubricant therefrom, the swept lubricant being impelled inwardly to the space intermediate the tip Y and the shaft 36.

By the use of such a narrow longitudinally extending tip upward thrusting of the lubricant against the end wall 12 of the container is largely avoided, the inwardly displaced lubricant being compacted and follows by adhesion the body of lubricant intermediately disposed relative to the mouth of the element 14. The obliquely inclined portions of the impeller effect not only an inwardly thrust, and a compacting action, but also a longitudinal thrust on the lubricant engaged by its advanced face tending to thrust it into the mouth of the lubricant conduit 11.

Referring now to the embodiment of my invention illustrated in Figs. 10 and 11, I have therein shown an impeller 34' whose blade is not inclined to the longitudinal axis of the piston rod 10', and whose shaft 36' is provided by an integral end of the blade 34' rolled to tubular form and having ratchet teeth 37 formed on its end edge similarly to the shaft 36 of the foregoing embodiment.

The blade 34' is curved proceeding outwardly toward the tubular walls of the reservoir 1 to present a concave face 50 to the body of lubricant engaged by the blade as the blade is rotated in the manner as described for the blade 34 in the circuitous direction indicated by the arrows in Fig. 10.

The impeller 34' is, like the impeller of the foregoing embodiment, provided with a narrow tip Y adapted to sweep lubricant from the cylindrical walls of the reservoir and having a portion X providing an inclined edge engageable with an annular surface of the conical end wall 17 of the reservoir. The portion X is cut away at N in order that lubricant displaced inwardly of the impeller and lodging adjacent to the inlet of the conduit 11, will not be disturbed by direct engagement by the impeller and will be left covering the inlet for said conduit to insure that air will not be drawn through the body of lubricant into said conduit when the piston 3 is withdrawn from the cylinder 2 after dispensing lubricant therefrom.

The impeller, therefore, sweeps the lubricant from the lateral walls of the reservoir pressing the lubricant body toward the axis of the reservoir, and by the compacting action exerted thereon, expresses air therefrom and thereby prevents the formation of a longitudinal passage for air through the body of lubricant, which passage would otherwise usually take the form of a funnel therein.

In both embodiments of my invention it will be understood that I preferably advance the blade step by step, in a circuitous direction, about the piston rod, responsive to successive lubricant compressing and dispensing operations of the gun, in the manner generally described and completely explained in my copending application, Serial No. 401,280, filed October 21, 1929, to which reference may be had in connection with my invention disclosed herein, which is more broadly claimed in my said copending application.

Preferably, as in my said copending application, movement of the impeller at each gun operation is only one-eighth of a complete revolution around the rod, although this may be varied within the purview of my invention.

Within the purview of my invention I contemplate the use of a coating for the lateral walls of the gun barrel which will greatly reduce the power of adhesion tending to cause adherence between said walls and the lubricant contained within the barrel. Such a coating may be of a preferably wet gelatinous nature or may be a mercury amalgam.

I have described the use of such a coating for lubricant conduits in a copending application, Serial No. 385,295, filed August 12, 1929, to which reference may be had.

I also contemplate employing a special grease in which such wet or mercurous substance is very finely comminuted and dispersed throughout the body of the lubricant, which finely divided substances act as a replenishing medium to the inside coatings on the walls of the barrel.

I have described the use of such a grease for lubricant conduits in a copending application, Serial No. 384,120, filed August 7, 1929 to which reference may be had.

Also, I contemplate the coating of the surfaces of the impeller with a similar, preferably wet, gelatinous substance or mercury amalgam to reduce the power of adhesion between the grease and such surfaces.

By reducing the adherence between the walls of the barrel and the surfaces of the impeller, the lateral portions of the grease flow more freely towards the dispensing outlet of the barrel and the suction draft exerted from said outlet on the body of grease will be more effective on the entire body of grease and the tendency towards producing an "air funnel", so-called, through the body of grease will be greatly reduced.

Having thus described my invention in certain embodiments, I am aware that numerous and extensive departures may be made from the embodiments herein illustrated and described, but without departing from the spirit of my invention.

I claim:

1. A grease gun comprising a grease containing reservoir, a rod extending substantially axially thereof, an impeller comprising a blade journaled on the rod and rotatable thereabout with lateral edges thereof adapted to sweep contiguously to lateral walls of the reservoir, a tubular extension extending longitudinally from the reservoir, a high pressure cylinder telescopable into said tubular extension over said rod, the end of said rod comprising a piston for said cylinder, and means responsive to a telescoping movement of the cylinder to rotatably move the impeller.

2. A grease gun comprising a grease containing reservoir, an impeller disposed therein provided with lateral edges extending longitudinally along inner surfaces of the reservoir lateral walls, a tubular extension for said reservoir, a high pressure cylinder, a piston supported within said extension, said cylinder telescopable within said extension and over said piston, and means responsive to a telescoping movement of the cylinder to circuitously move the impeller to sweep the lateral walls of the reservoir.

3. A grease gun comprising a grease containing reservoir, an impeller comprising an edge portion extending longitudinally along lateral walls of the reservoir, a piston supported by the reservoir, a cylinder telescopable over said piston, and means responsive to a telescoping movement of the cylinder to circuitously move the said impeller edge portion over the lateral walls of the reservoir.

4. In combination, a grease gun barrel, an impeller positioned therein and circuitously movable to sweep the lateral walls thereof, a nozzle element slidably supported on the barrel, a lubricant compressor operable upon an inward sliding movement of the nozzle element relative to the barrel, and means to effect a partial circuitous movement of the impeller responsive to a sliding movement of said nozzle element to operate said compressor.

5. In combination, a grease gun barrel, an impeller positioned therein, and circuitously movable to sweep the lateral walls thereof, a nozzle element slidably supported on the barrel, and a lubricant compressor, said compressor and said impeller operable upon an inward sliding movement of the nozzle element, to coincidentally eject lubricant from the nozzle and to effect sweeping of the barrel walls, respectively.

6. In combination, a grease gun barrel, an impeller positioned therein and circuitously movable to sweep the lateral walls thereof, a nozzle element slidably supported on the barrel, and a lubricant compressor, said compressor and said impeller operable upon sliding movements of the nozzle element, to eject lubricant from the nozzle and to effect sweeping of the barrel walls, respectively.

7. In combination, a grease gun barrel, an impeller positioned therein and circuitously movable to sweep the lateral walls thereof, means to dispense lubricant under pressure from an end of the barrel, and mechanism responsive to operation of said means for operating the impeller, said impeller having its advanced face of concavely curved form.

8. In combination, a grease gun barrel, an impeller positioned therein and circuitously movable to sweep the lateral walls thereof, means to dispense lubricant under pressure from an end of the barrel, and mechanism responsive to operation of said means for operating the impeller, said impeller being of relatively thin material and having a blade portion extending longitudinally along lateral walls of the barrel of greater length than portions of the blade disposed inwardly therefrom.

9. In combination, a grease gun barrel, an impeller positioned therein and circuitously movable to sweep the lateral walls thereof, means to dispense lubricant under pressure from an end of the barrel, and mechanism responsive to successive operation of said means for successively operating the impeller, in step by step movements in the same direction, said impeller having a barrel sweeping wall portion of greater length than other portions inwardly disposed therefrom.

10. In combination, a grease gun barrel, a hand grip fixedly supported to an end thereof, a tubular nozzle supporting element longitudinally telescopable into the opposite end thereof, a piston supported within the barrel in axial alignment with said supporting element and over which the barrel may telescope, a check valve in the supporting element, a spring for retracting the supporting element, an impeller positioned within the barrel intermediate said first end thereof and said piston, and journaled to move circuitously about the axis of the barrel to sweep the lateral walls surrounding it, said impeller operative responsive to telescoping movements of said supporting element.

11. In combination, a grease gun barrel, a hand grip fixedly supported to an end thereof, a tubular nozzle supporting element longitudinally telescopable into the opposite end thereof, a tubular extension for the barrel extending from the other end thereof, a piston within said extension, said supporting element telescopable over said piston, a spring for retracting the supporting element, an impeller journaled within the barrel, means to move the impeller circuitously about its axis to sweep the lateral walls of the barrel responsive to telescoping movements of the supporting element over said piston.

12. In combination, a grease gun barrel, a hand grip fixedly supported to an end thereof, a tubular nozzle supporting element longitudinally telescopable into the opposite end thereof, a tubular extension for the barrel extending from the other end thereof, a piston within said extension, said supporting element telescopable over said piston, a spring for retracting the supporting element, an impeller journaled within the barrel, means to move the impeller circuitously about its axis to sweep lateral walls of the barrel, resilient means restraining longitudinal movement of the piston, and means responsive to longitudinal movement of the piston against the power of said resilient means to effect operation of said impeller moving means.

In testimony whereof I hereunto affix my signature this 19th day of October, 1929.

OSCAR U. ZERK.